United States Patent
Meyer et al.

(10) Patent No.: US 12,482,273 B2
(45) Date of Patent: Nov. 25, 2025

(54) DETECTING, IDENTIFYING, AND TRACKING OBJECTS BASED UPON A TENSOR WITH SPARSELY COMPUTED NON-ZERO VALUES

(71) Applicant: GM Cruise Holdings LLC, San Francisco, CA (US)

(72) Inventors: Michael Meyer, Munich (DE); Marc Unzueta Canals, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 372 days.

(21) Appl. No.: 18/105,219

(22) Filed: Feb. 2, 2023

(65) Prior Publication Data

US 2024/0265708 A1 Aug. 8, 2024

(30) Foreign Application Priority Data

Feb. 2, 2023 (EP) .................................. 23154716

(51) Int. Cl.
  *G06V 20/00* (2022.01)
  *G06V 10/82* (2022.01)
  *G06V 20/58* (2022.01)
(52) U.S. Cl.
  CPC .............. *G06V 20/58* (2022.01); *G06V 10/82* (2022.01)
(58) Field of Classification Search
  CPC ...... G06V 20/58; G06V 10/82; G06V 10/247; G06V 10/34
  See application file for complete search history.

(56) References Cited

U.S. PATENT DOCUMENTS

2021/0278852 A1* 9/2021 Urtasun .................. G06T 17/05
2023/0121534 A1* 4/2023 Rukhovich ............ G06V 10/40
  382/103

FOREIGN PATENT DOCUMENTS

WO  WO-2022271639 A1 * 12/2022 ............. G06N 3/045

OTHER PUBLICATIONS

"Extended European Search Report for European Patent Application No. 23154716.7", Mailed Date: May 24, 2023, 68 pages.
Jang, et al., "Categorical Reparameterization With Gumbel-Softmax", arxiv.org, Nov. 3, 2016, 12 pages.
(Continued)

*Primary Examiner* — Xiao Liu
(74) *Attorney, Agent, or Firm* — CANTOR COLBURN LLP

(57) ABSTRACT

Technologies for detecting, identifying, and tracking objects in a scene based upon images generated by a camera are described. A computing system obtains a perspective image from the camera and generates a feature image based upon the perspective image. The feature image has X×Y pixels, and each pixel in the X×Y pixels has a feature vector that includes values assigned thereto. The feature image is provided as input to a machine learning model, where the machine learning model generates a tensor based upon the feature image, where the tensor includes several bins that include values that are representative of likelihoods that an object exists in the scene at distances from the camera that correspond to the bins. The machine learning model is trained using a Gumbel-softmax algorithm. The computing system generates the image in the overhead view based upon the tensor output by the machine learning model.

20 Claims, 9 Drawing Sheets

(56) References Cited

OTHER PUBLICATIONS

Lee, et al., "Bird's Eye View Localization of Surrounding Vehicles: Longitudinal and Lateral Distance Estimation With Partial Appearance", In Robotics and Autonomous Systems, vol. 112, 2019, pp. 178-189.

* cited by examiner

DETECTING, IDENTIFYING, AND TRACKING OBJECTS BASED UPON A TENSOR WITH SPARSELY COMPUTED NON-ZERO VALUES

RELATED APPLICATION

This application claims priority to European Patent Application No. EP 23154716.7, filed on Feb. 2, 2023, and entitled "DETECTING, IDENTIFYING, AND TRACKING OBJECTS BASED UPON A TENSOR WITH SPARSELY COMPUTED NON-ZERO VALUES", the entirety of which is incorporated herein by reference.

BACKGROUND

Computer-implemented perception systems can obtain an image in a perspective view of a scene (generated by a camera) and can detect and track an object in the scene based upon such image in the perspective view. More specifically, a computer-implemented model (such as a convolutional neural network) receives the image in the perspective view in generates a feature image that includes X×Y pixels. Each pixel in the feature image has a feature vector assigned thereto, where the feature vector includes values of features in pixels of the image in the perspective view that correspond to the pixel in the feature image. Therefore, pixel $X_1$, $Y_1$ has a first feature vector assigned thereto, pixel $X_2$, $Y_2$ has a second feature vector assigned thereto, etc.

A tensor generator module generates a 3-dimensional tensor based upon the featured image. The tensor has several bins, where each bin in the tensor corresponds to a height range, a width range, and a depth range, and further where the height range and the width range correspond to a respective pixel in the feature image. For example, the feature image is a 100 pixel×100 pixel image, and the tensor is to cover 100 meters at depth ranges of 1 meter; accordingly, the tensor includes 100×100×100 bins. In this example, the tensor generator module conventionally computes a value for each bin in the tensor, where a value computed for a bin in the three-dimensional tensor is indicative of a likelihood that an object exists in the scene at a spatial position in the scene that corresponds to the bin. Therefore, when the feature image is a 100 pixel×100 pixel image, and the tensor is to include 100 bins in depth that correspond to each pixel, the tensor generator module computes one million values for the tensor. It can be recognized that a 100 pixel×100 pixel image is a relatively low resolution image, and that in practice the tensor generator module computes many more values for each image of a scene.

An image of the scene in an overhead view is generated based upon the tensor, and the image of the scene in the overhead view is provided to a computer-implemented model that identifies and tracks objects in the scene based upon the image in the overhead view. This process is repeated as the camera continues to generate images. The technologies described above have been incorporated in various applications, including autonomous driving scenarios, such that an autonomous vehicle (AV) can detect, identify, and track objects in an environment of the AV.

As can be ascertained from the above, a tensor consumes a relatively large amount of memory, as the tensor includes millions of values. Accordingly, resolutions in height, width, and/or depth of bins of the tensor are limited and/or extents of height, width, and/or depth represented by the tensor are limited. Continuing with the example set forth above, each of the bins may represent a range of ½ meter in height, ½ meter in width, and ½ meter in depth. It may, however, be desirable to improve the resolution so that each bin represents ¼ meter in height, ¼ meter in width, and ¼ meter in depth. Modifying the resolutions of the bins such that each depth bin represents ¼ meters in height, width, and depth while maintaining the same extents in height, width, and depth (e.g., 50 meters) increases the number of values in the tensor by a factor of 8. Even if it were desired to only increase the extent in depth while maintaining the same resolution, doing so results in a significant increase in the number of values that the tensor includes. The relatively large amount of computer-readable memory needed to store tensors is problematic in many computing environments and applications, as an amount of computer-readable memory in such computing environments is finite.

SUMMARY

The following is a brief summary of subject matter that is described in greater detail herein. This summary is not intended to be limiting as to the scope of the claims.

Described herein are various technologies pertaining to a computer-implemented system that detects, identifies, and tracks objects in an environment of a camera. More specifically, the technologies described herein are directed towards a computer-implemented system that constructs a tensor based upon a feature image, where the computer-implemented system is trained to sparsely compute non-zero values for bins of the tensor, thereby reducing an amount of memory needed to store the tensor. With more specificity, the computer-implemented system is trained using a Gumbel-softmax algorithm, which results in the computer-implemented system computing values of 0 for bins in the tensor when a conventional computer-implemented system would compute non-zero values for such bins (where the non-zero values would be very low). Accordingly, less memory is needed to store the tensor when compared to the memory needed to store tensors of the same size that are generated through conventional approaches.

In an example, the aforementioned computer-implemented system is a perception system that is executed by a processor of a computing system. The computing system is optionally included in an autonomous vehicle (AV), such as a level 5 AV. In other examples, the computing system is included in a vehicle that executes a driver-assist system, where the vehicle is not fully autonomous. In still other examples, the computing system is included in nautical vehicles, aircraft, security systems, etc.

In operation, a camera generates an image of a scene, where the scene includes an object, and further where the image is in a perspective view (e.g., an optical axis of the camera is +/−15° from horizontal). The computing system obtains the image generated by the camera and provides the image as input to the computer-implemented system. The computer-implemented system can be or include an artificial neural network (ANN) (such as a deep neural network (DNN), residual neural network, convolutional neural network (CNN), or other suitable machine learning model(s)). The computer-implemented system generates a feature image based upon the image obtained from the camera. The feature image includes X×Y pixels, where the feature image may have the same resolution as the image obtained from the camera, lower resolution than the image obtained from the camera, or higher resolution than the image obtained from the camera. Each pixel in the feature image has a feature vector assigned thereto, where the feature vector includes values for features in the image obtained from the camera that spatially correspond to the respective pixel. The features can be learned by the computer-implemented model during training, where the learned features are employed in connection with detecting, identifying (classifying), and tracking objects in scenes.

The computer-implemented system computes a 3-dimensional tensor based upon the featured image. As described above, the computer-implemented system sparsely computes non-zero values in the tensor due to the computer-implemented system being trained using the Gumbel-softmax algorithm. Thus, the computer-implemented model computes non-zero values for bins in the tensor where there is a relatively high likelihood that an object exists in the scene at spatial positions that correspond to such bins. For bins in the tensor that correspond to spatial regions in the scene where there is a relatively low likelihood of an object existing, the computer-implemented system computes values of 0 for such bins. Only the non-zero elements of the resulting sparse tensor need to be stored. Thus, the tensor consumes less memory when compared to tensors generated by way of conventional approaches.

An image in an overhead view (sometimes referred to as a "Birds Eye View") is generated based upon the tensor and the feature image, and the computer-implemented system detects and identifies an object in the scene based upon the image in the overhead view. In addition, the computer-implemented system can track the object in the scene over time. When the computer-implemented system is included in an AV, a control system controls at least one of a propulsion system (e.g., a combustion engine, an electric motor, etc.), a steering system, or a braking system of the AV based upon the identified and tracked object in the scene.

From the foregoing, it can be ascertained that the technologies described herein exhibit various technical advantages over conventional approaches for detecting, identifying, and tracking objects in a scene based upon images generated by a camera. More specifically, the computer-implemented system computes a relatively sparse 3-dimensional tensor, and thus memory consumed by such tensor is less than memory consumed by tensors generated by way of conventional approaches that compute probability values for all pixels. Alternatively, resolution or extent in height, width, and/or depth of tensors can be increased without consuming a significant amount memory when compared to tensors generated by way of conventional approaches.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
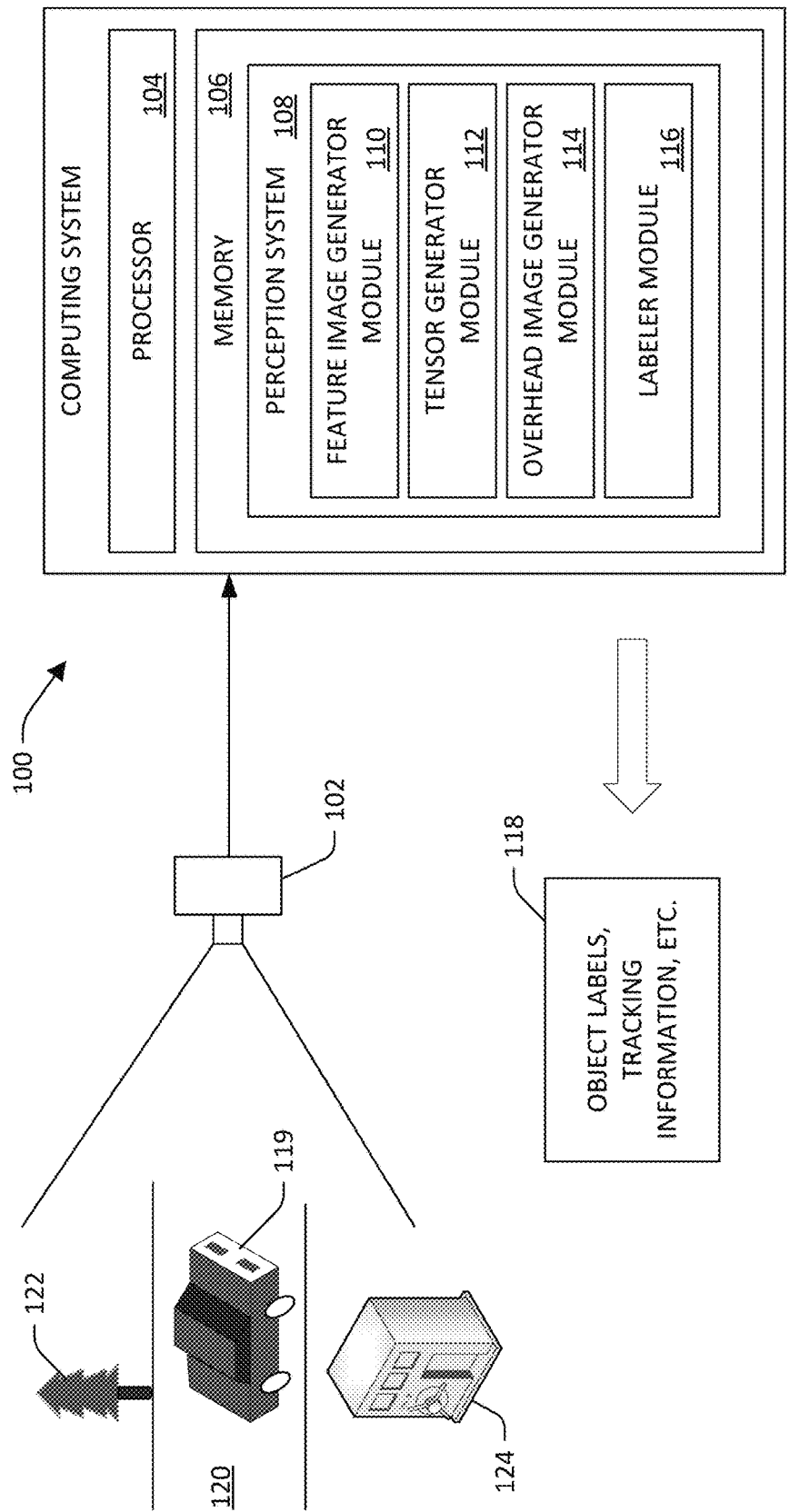
FIG. 1 is a functional block diagram of a computing system that is configured to detect, identify, and track objects in a scene.

Various technologies pertaining to detecting, identifying, and tracking objects in an environment based upon an image generated by a camera are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "system," and model are intended to encompass computer-readable data storage that is configured with computer-executable instructions that cause certain functionality to be performed when executed by a processor. The computer-executable instructions may include a routine, a function, or the like. It is also to be understood that a component, system, or model may be localized on a single device or distributed across several devices.

Described herein are various technologies pertaining to detecting, identifying, and tracking an object in an environment based upon an image of a scene in the environment generated by a camera, where the image is captured in a perspective view. As will be described in greater detail below, a camera generates an image of a scene in an environment of the camera. A computer-implemented system is provided with the image in the perspective view, and the computer-implemented system generates a feature image based upon the image in the perspective view. The feature image has X×Y pixels, where each pixel has an N-dimensional feature vector assigned thereto, and further where the feature vector for a pixel in the feature image includes N values for N features at positions in the perspective image that correspond to the pixel in the feature image. The computer-implemented system generates a 3-dimensional tensor based upon the feature image. In contrast to conventional approaches, the computer-implemented system is trained to generate a sparsely populated tensor, such that several bins in the tensor include values of 0. Put differently, a bin in the tensor has a non-zero value when there is a relatively high likelihood that a spatial region (in the scene captured in the image) corresponding to the bin has an object therein. Compared to conventional approaches, then, less memory is needed to store the tensor. An image of the scene in an overhead view is generated based upon the tensor and the feature image, and the computer-implemented system detects, identifies, and/or tracks an object in the scene based upon the image in the overhead view. Each pixel in the image of the scene in the overhead view can have a feature vector assigned thereto, as the image of the scene in the overhead view can be generated by computing the outer product of the feature image and the tensor.

The technologies described herein exhibit various advantages over conventional approaches associated with detecting, identifying, and/or tracking objects in a scene based upon 2-dimensional images generated by cameras. As noted above, a tensor is relatively sparsely populated with values, and thus resolution in height, width, and/or depth (range) can be increased without increasing an amount of computer readable memory required to store a tensor generated by way of conventional approaches. Accordingly, utilizing the same hardware resources as is conventionally employed, a perception system that detects, identifies, and tracks objects in a scene can employ a higher resolution tensor in height, width, and/or range when performing object detection, identification, and/or tracking.

Referring now to FIG. 1, a functional block diagram of a computing system 100 that is configured to detect, identify, and track objects based upon images generated by cameras in perspective views is illustrated. A camera 102 is in communication with the computing system 100, where the camera 102 is configured to generate images. For instance, the camera 102 can generate images at a relatively high frame rate, such as above 10 frames per second. The camera 102 is a color camera that generates color images in perspective views. For instance, the camera 102 is mounted on a vehicle and has an optical axis that is approximately parallel to horizontal. In an example, the optical axis of the camera 102 is +/−15 degrees from horizontal.

The computing system 100 includes a processor 104 and memory 106, where the memory 106 has loaded therein a computer-implemented perception system 108 that is executed by the processor 104. The processor 104 can be or include any suitable type of processor, such as a central processing unit (CPU), a graphics processing unit (GPU), a field programmable gate array (FPGA), an application-specific integrated circuit (ASIC), and so forth. The memory 106 can be or include random access memory (RAM), such as Static RAM (SRAM) and/or Dynamic RAM (DRAM). Additionally or alternatively, the memory 106 can be or include read only memory (ROM), such as Programmable ROM (PROM), Erasable Programmable ROM (EPROM), Electrically Erasable Programmable ROM (EEPROM), etc.

The perception system 108 is configured to detect, identify, and track objects in scenes captured in images generated by the camera 102. The perception system 108 includes a feature image generator module 110 that generates feature images based upon images obtained from the camera 102. The feature image generator module can be any suitable type of computer-implemented model or a portion thereof, where computer-implemented models include neural networks, such as convolutional neural networks (CNNs), recurrent neural networks (RNNs), residual neural networks, amongst others. Feature images generated by the feature image generator module 110 have X×Y pixels, where each pixel has a feature vector assigned thereto. A feature vector assigned to a pixel includes values for features of the image obtained by the camera 102 at spatial positions in the image generated by the camera 102 that correspond to the pixel in the feature image. For example, the feature image may have lower resolution than the image obtained by the camera 102, and thus a feature vector assigned to a pixel in the feature image can include values of features represented in multiple pixels in the image obtained from the camera 102. The features are learned during training of the perception system 108 as those that are well-suited for use in connection with detecting, identifying, and/or tracking objects captured in images in perspective views.

The perception system 108 further includes a tensor generator module 112 that is configured to generate 3-dimensional tensors based upon feature images output by the feature image generator module 110. As with the feature image generator model 110, the tensor generator module 112 can be or include any suitable type of computer-implemented model or can be a portion thereof. A tensor includes X×Y×M bins, with each bin representing a spatial region in the environment in height, width, and depth. Thus, each bin in the tensor corresponds to a height range, a width range, and a depth range of a scene captured in an image generated by the camera 102. In a non-limiting example, a bin in the tensor can represent a spatial region in the scene having ½ meter in height, ½ meter in width, and ½ meter in depth. Values in bins of a tensor (computed by the tensor generator module 112) are indicative of likelihoods of objects existing at spatial positions in the environment that are represented by the bins. Accordingly, when a bin of a tensor includes a relatively high value, the tensor generator module 112 has computed that there is a relatively high likelihood that an object exists in the environment at a spatial position that that is represented by the bin. Conversely, when a bin of a tensor includes a relatively low (e.g., zero) value, the tensor generator module 112 has computed that there is a relatively low likelihood that an object exists in the environment at a spatial position that is represented by the bin.

In contrast to conventional approaches, the tensor generator module 112 generates tensors that are sparsely populated with non-zero values. With more particularity, conventional tensor generator modules are trained to compute scores for each bin in the tensor and populate such bins with the computed scores. As noted above, this conventional approach causes tensors to consume a significant amount of memory. Thus, even when the tensor generator module 112 computes that there is a very low likelihood of an object existing in the environment at a spatial location that corresponds to a bin in the tensor, the tensor generator module 112 nevertheless computes such value for the tensor and stores the computed value in the bin in the tensor. To address the issue of memory consumption by tensors, the tensor generator module 112 is trained to sparsely compute and store values in tensors (e.g., the tensor generator module 112 only computes values for bins where there is a relatively high likelihood that an object exists in the environment at spatial positions in the environment that correspond to the bins). Put differently, the tensor generator module 112 is trained to compute values of 0 for bins in the tensor when spatial positions in the environment that are represented by such bins have a relatively low likelihood of including an object.

In connection with training the tensor generator module 112 to sparsely compute non-zero values for bins of the tensor, the tensor generator module 112 can be trained using a Gumbel-softmax algorithm. The Gumbel-softmax algorithm has conventionally been used to approximate a discrete sampling from a categorical distribution and subsequently performing a reparameterization on such distribution. The Gumbel-softmax algorithm involves adding noise to the logits of a categorical distribution before taking the argmax to sample from such distribution. The reparameterization involves reparameterizing a stochastic function so that noise is independent of inputs to such function, allowing the function to be backpropagated through during training. The Gumbel-softmax algorithm combines sampling from a categorical distribution and reparameterization by introducing a temperature parameter that allows for interpolation between discrete sampling and a continuous relaxation of the categorical distribution, making it possible to backpropagate through the sampling process. To allow for use of the Gumbel-softmax algorithm, the inventors have recognized that non-overlapping ranges (in height, width, and/or depth) can represent discrete categories, and thus the sampling and reparameterization referenced above can be undertaken with respect to such ranges.

The perception system 108 additionally includes an overhead image generator module 114 that is configured to generate overhead images based upon tensors output by the tensor generator module 112 and feature images output by the feature image generator module 110. In an example, the overhead image generator module 114 generates overhead images by computing an outer product of a tensor generated by the tensor generator module 112 and a feature image used to generate the tensor.

The perception system 108 further includes a labeler module 116 that detects, identifies, and/or tracks objects captured in images generated by the camera 102 based upon overhead images output by the overhead image generator module 114. The labeler module 116, then, outputs information 118, where such information can be or include object labels, tracking information, and so forth. Similar to the feature image generator module 110 and the tensor generator module 112, the labeler module 116 can be or include any suitable computer-implemented model or can be a portion thereof.

The computing system 100 can be employed in a variety of environments and contexts. In an example, an autonomous vehicle (AV) includes the computing system 100, where the AV autonomously navigates roadways based upon the computing system 100 detecting, identifying, and tracking objects in the environment of the AV 100 (e.g., where the computing system 100 detects, identifies, and tracks objects based upon images generated by the camera 102). In another example, the computing system 100 can be included in a vehicle that comprises a driver assistance system, where the vehicle is not fully autonomous. In yet another example, the computing system 100 is included in an aerial vehicle, such as an airplane, a drone, etc. In still yet another example, the computing system 100 is included in a security system that is configured to detect, identify, and track potential threats to an item or region being secured by the security system. Other examples will be readily appreciated.

Figure 2:
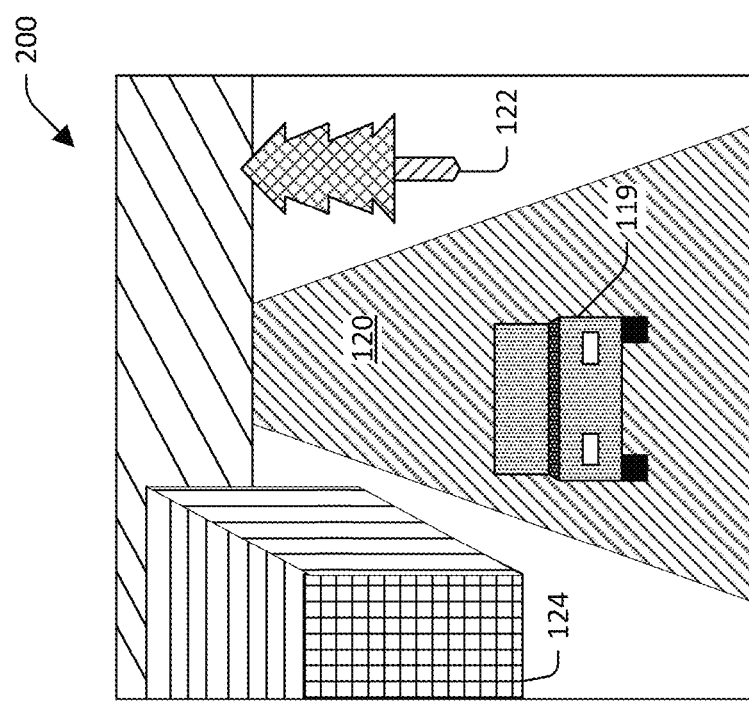
FIG. 2 illustrates an image of a scene in a perspective view.

An example of operation of the computing system 100 is now set forth with respect to FIGS. 1-6. The camera 102 captures an image of a scene, where the scene includes a vehicle 119, a road 120 upon which the vehicle 119 is traveling, a tree 122 on a first side of the road 120, and a building 124 on a second side of the road that is opposite the first side of the road. Turning to FIG. 2, an image 200 of the scene generated by the camera 102 is illustrated. The image 200 depicts the tree vehicle 119, the road 120, the tree 122, and the building 124. The image 200 is a color image, and accordingly the camera 102 is a camera that generates color images through use of an image sensor, such as a charge-coupled device (CCD) sensor, a complementary metal-oxide semiconductor (CMOS) sensor, a back-side illuminated CMOS sensor, a front-side illuminated CMOS sensor, a phase detection and autofocus (PDAF) sensor, a global shutter sensor, etc.

Figure 3:
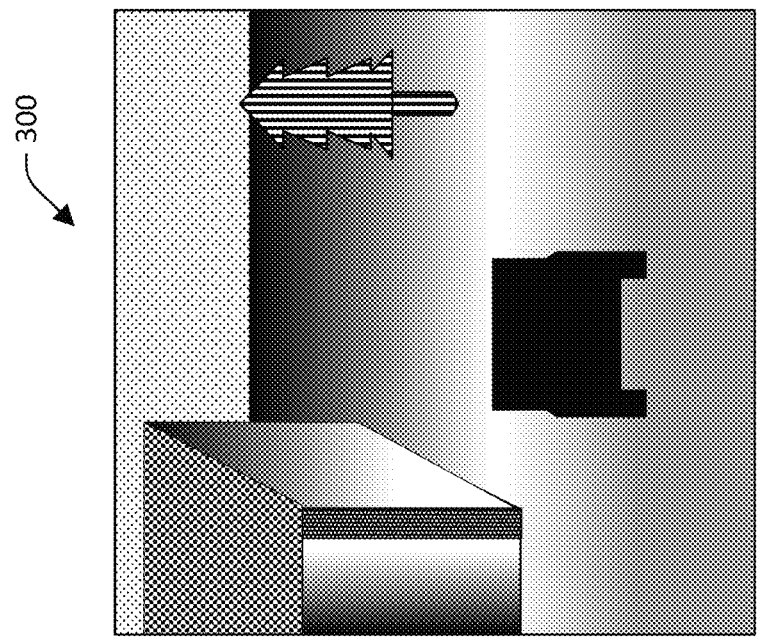
FIG. 3 illustrates a feature image of the scene, where the feature image is generated based upon the image of the scene in the perspective view depicted in FIG. 2.

Returning to FIG. 1, the computing system 100 obtains the image 200 generated by the camera 102, and the image 200 is provided to the perception system 108. The feature image generator module 110 receives the image 200 as input and generates a feature image based upon such image 200. Referring briefly to FIG. 3, a feature image 300 that is based upon the image 200 is depicted, where values of a feature from amongst N features are employed to visually depict the feature image 300. As noted above, the feature image 300 includes X×Y pixels (X columns of pixels and Y rows of pixels). Each pixel in the feature image 300 has a feature vector assigned thereto, where the feature vector for a pixel includes values that are representative of features of the image 200 that correspond spatially to the pixel in the feature image 300. In an example, at least one value in a feature vector for a pixel is indicative of depth from the camera 102 of an object in the scene that corresponds to the pixel.

Figure 4:
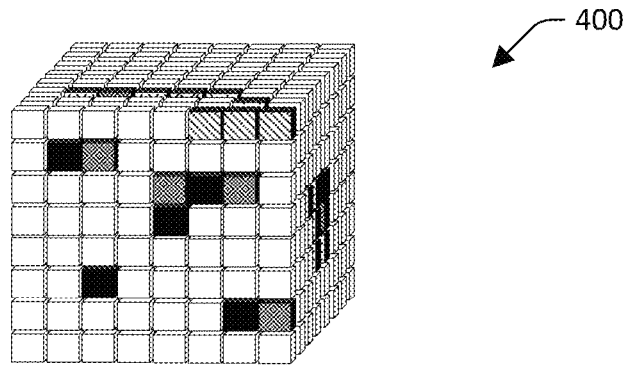
FIG. 4 depicts a 3-dimensional tensor that is computed based upon the feature image illustrated in FIG. 3, where the tensor is generated by way of conventional approaches.
Figure 5:
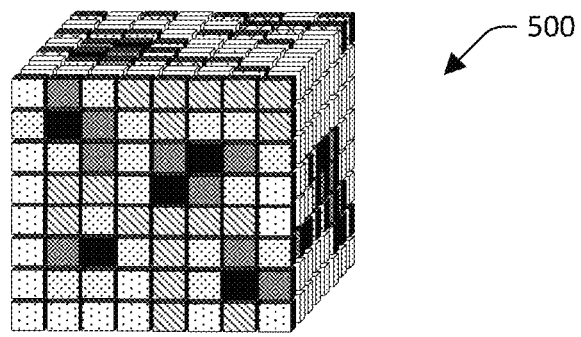
FIG. 5 depicts a 3-dimensional tensor that is computed based upon the feature image illustrated in FIG. 2, where the tensor includes relatively few non-zero values.

Returning again to FIG. 1, the tensor generator module 112 generates a tensor based upon the feature image 300. As noted above, the tensor generated by the tensor generator module 112 includes X×Y×M bins, where each bin corresponds to respective ranges of height, width, and depth in three-dimensional space. FIG. 4 depicts a representation of a tensor 400 generated by the tensor generator module 112 based upon the feature image 300. Shading in bins of the tensor 400 is representative of values computed for the bins by the tensor generator module 112, where darker shading represents higher values. As can be ascertained, the tensor 400 includes a relatively large number of bins that have a value of 0 assigned thereto (and thus a relatively sparse number of bins having non-zero values). With reference briefly to FIG. 5, a tensor 500 generated by way of conventional technologies is illustrated. It can be ascertained that the tensor 500 includes scores for each bin in the tensor 500, even when the scores have relatively small values (as depicted with light shading). Accordingly, the tensor 500 consumes a significantly larger amount of memory than the tensor 400.

Figure 6:
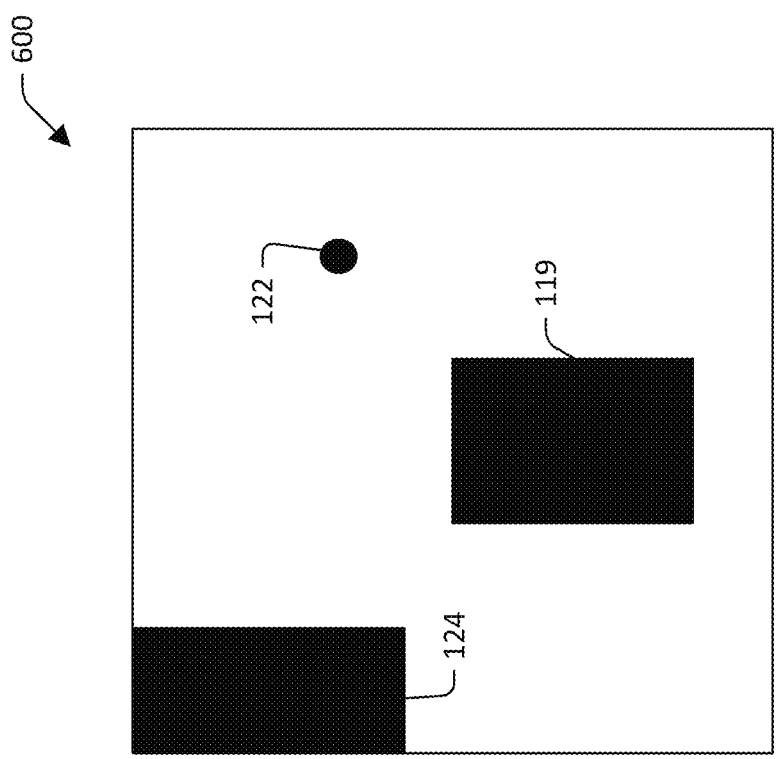
FIG. 6 illustrates an overhead image of the scene, where the overhead image of the scene is generated based upon the feature image of the scene illustrated in FIG. 3 and the tensor depicted in FIG. 5.

Returning again to FIG. 1, the overhead image generator module 114 receives the tensor 400 generated by the tensor generator module 112 and generates an overhead (feature) image based upon the tensor 400 and the feature image 300. With reference to FIG. 6, the overhead image generator module 114 generates an overhead image 600 based upon the tensor 400 and the feature image 300 (e.g., the overhead image generator module 114 computes an outer product of the feature image 300 and the tensor 400 to generate the overhead (feature) image 600. It can be ascertained that the overhead image generator module 114 can generate Y overhead images (one for each row) based upon the tensor 400 and the feature image 300.

The labeler module 116 receives the overhead image 600 computed by the overhead image generator module 114 and detects, identifies, and/or tracks objects in the scene captured by the camera 102 based upon such image 600. As illustrated in FIG. 6, the overhead image 600 depicts the vehicle 119, the tree 122, and the building 124 at a particular height above ground. The labeler module 116 outputs the information 118 based upon overhead images (including the image 600) output by the overhead image generator module 114.

Figure 7:
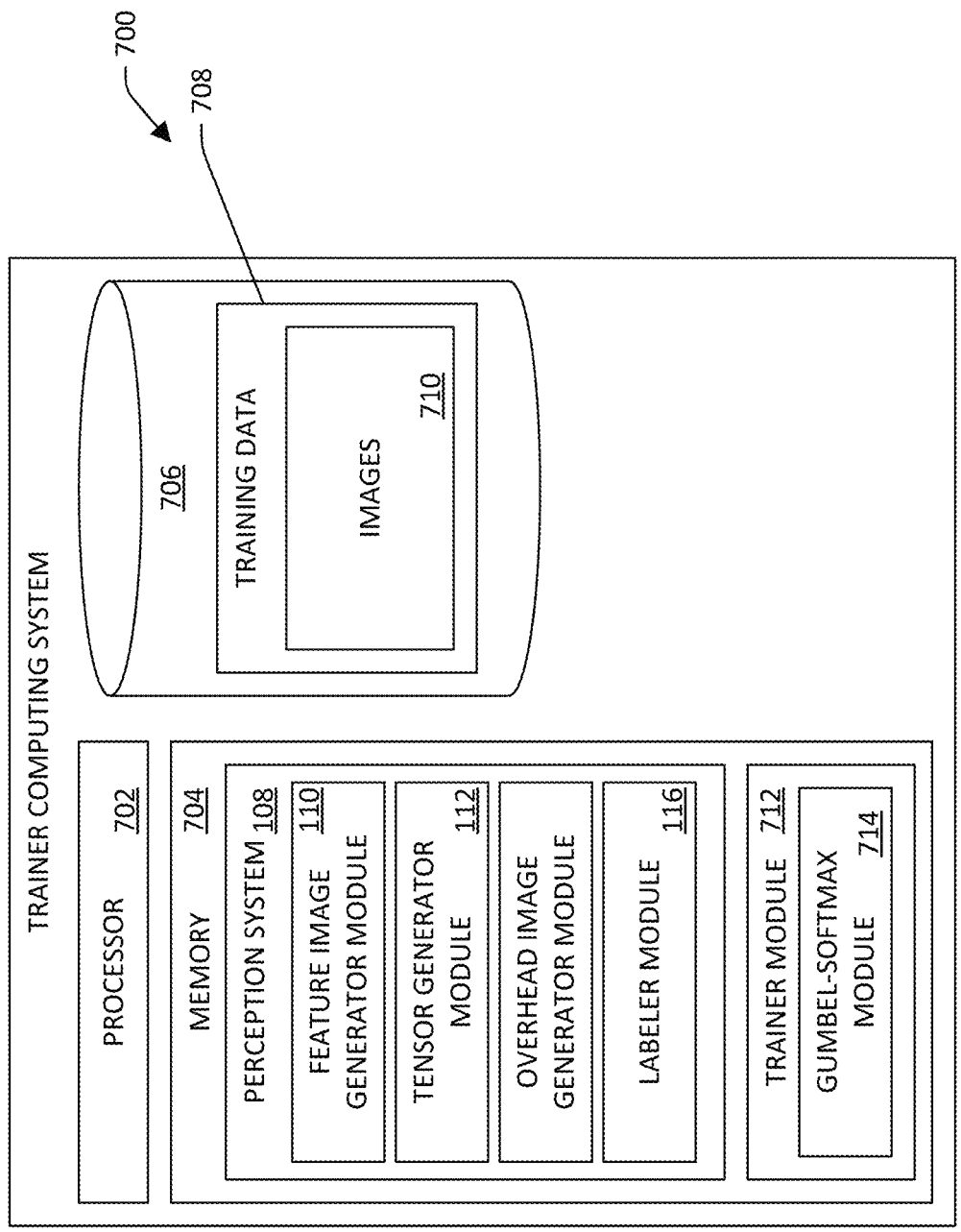
FIG. 7 is a functional block diagram of a computing system that is configured to train a perception system to detect, identify, and track objects based upon images generated by a camera.

Now referring to FIG. 7, a functional block diagram of a trainer computing system 702 that is configured to train the perception system 108 is illustrated. The trainer computing system 700 includes a processor 702, memory 704, and a data repository 706. The data repository 706 can be a hard drive, a solid-state drive, or other suitable computer readable storage that can store data. The data store 706 stores training data 708 that is used in connection with training the perception system 108. The training data 708 includes images 710 that have labels assigned thereto. Labels assigned to an image can include a classification of an object in the image (e.g., an identity of the object in the image) and location of such object in 3-dimensional space relative to the camera that captured the image (e.g., boundaries of the object in 3-dimensional space).

The memory 704 includes the perception system 108 and a trainer module 712 that trains the perception system 108 based upon the training data 708 using, for example, backpropagation. The trainer module 712 can jointly train the feature image generator module 110, the tensor module 112, and the labeler module 114, where modules can be or include at least one machine learning model that has weights that are to be learned during training. The trainer module 712 includes a Gumbel-softmax module 714 that uses the Gumbel-softmax algorithm referenced above in connection with training the perception system 108 generally, and the tensor generator module 112 specifically. Initially, the Gumbel-softmax module 714 can employ a value for a temperature parameter that is relatively high, and such temperature parameter value can be decreased over time during training. A final value for the temperature parameter can be determined heuristically, set by a designer, etc. As the temperature value is reduced, the tensor generator module 112 computes fewer values for bins in tensors. The feature generator module 110, the tensor generator module 112, and the labeler module 116 can be jointly trained such that the perception system 108 performs suitably in connection with detecting, identifying, and tracking objects based upon images captured by cameras.

Figure 8:
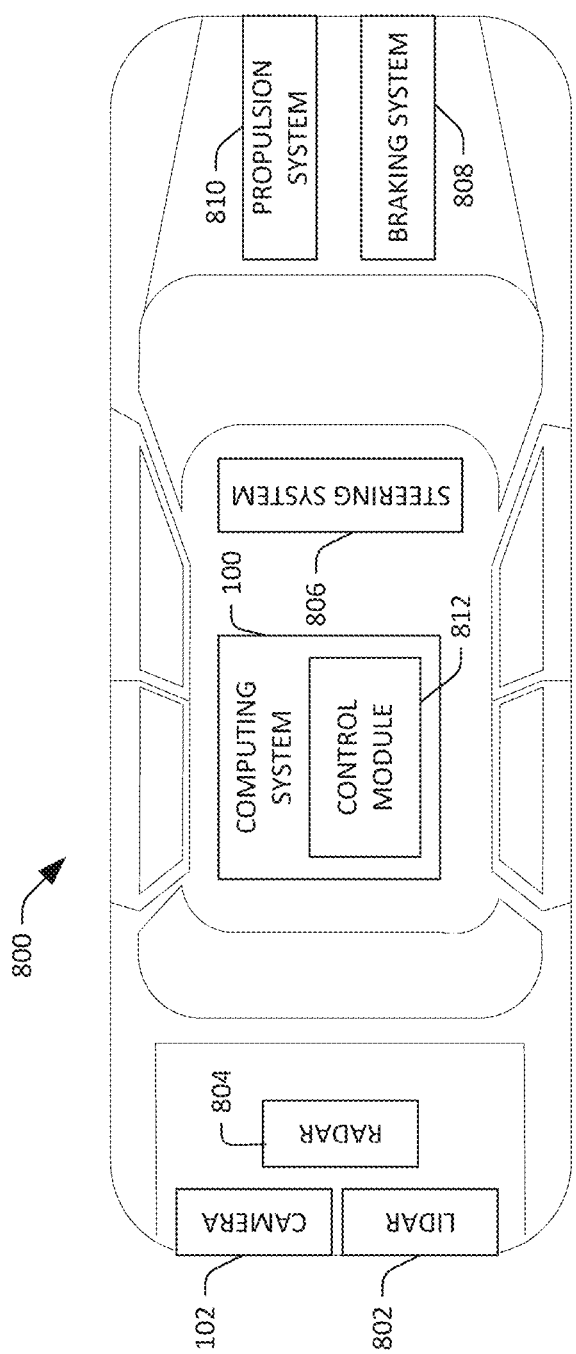
FIG. 8 is a schematic of an autonomous vehicle (AV).

FIG. 8 is a schematic of a vehicle 800, where the vehicle 800 may be a fully autonomous (level 5) AV, a vehicle that includes a driver assistance system, etc. The vehicle 800 includes the computing system 100, where the computing system 100 includes the perception system 108 (not shown in FIG. 8). The vehicle 800 further includes several sensors. The sensors can include, for example, the camera 102, a lidar sensor 802, a radar sensor 804, amongst other sensors. For instance, while not illustrated, the vehicle 800 may include ultrasonic sensors or other suitable sensors. The vehicle 800 also includes mechanical systems that effectuate movement (or lack of movement) of the vehicle 800. For instance, the vehicle 800 includes a steering system 806, a braking system 808, and a propulsion system 810. The steering system 806 can include a steering wheel, a rack and pinion steering arrangement, and so forth. The braking system 808 can include a disc brake, an engine brake, or other suitable mechanisms for decelerating the vehicle 800. The propulsion system 810 can be an electric motor, a combustion engine, a hybrid motor, a hydrogen-powered system, etc.

The computing system 100 further includes a control module 812 that controls at least one of the steering system 806, the propulsion system 810, or the braking system 808 based upon objects that have been detected, identified, and tracked by the perception system 108. While the perception system 108 has been described as detecting, identifying, and tracking objects in scenes based upon images generated by the camera 102, it is to be understood that the perception system 108 can additionally employ lidar scans from the lidar sensor 802 and/or radar scans from the radar sensor 804 in connection with detecting, identifying, and tracking objects.

Figure 9:
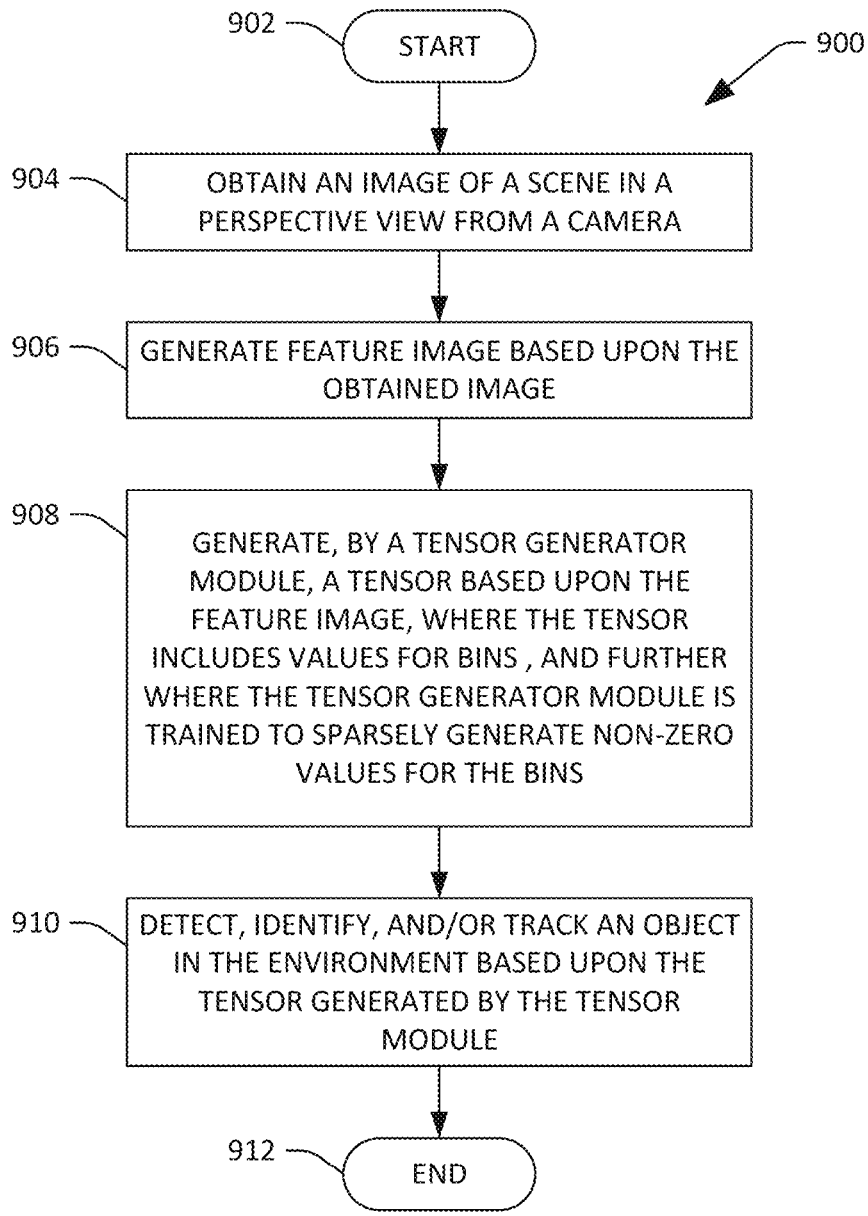
FIG. 9 is a flow diagram that illustrates a methodology for detecting an object in an environment based upon an image of a scene within the environment.
Figure 10:
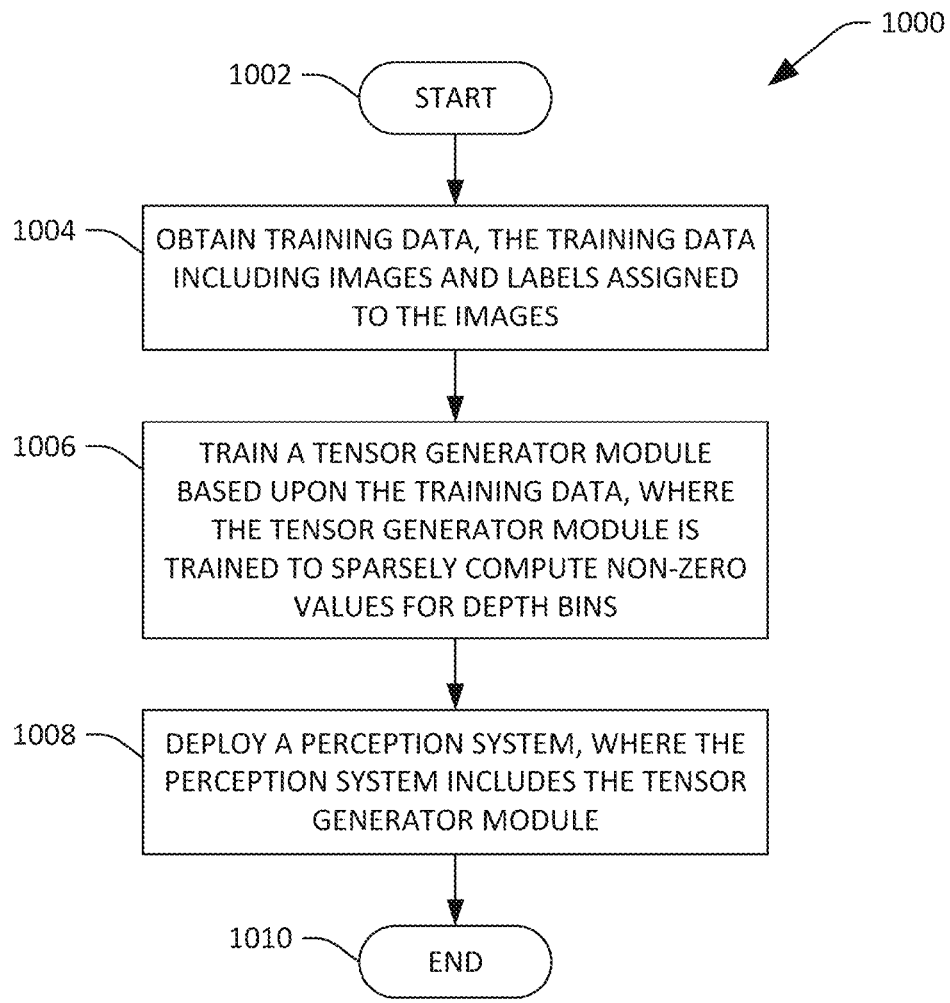
FIG. 10 is a flow diagram that illustrates a methodology for training a computer-implemented system to compute a sparse tensor based upon an image obtained from a camera.

FIGS. 9 and 10 illustrate methodologies relating to detecting, identifying, and tracking objects in scenes. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a subroutine, programs, a thread of execution, and/or the like. Still further, results of acts of the methodologies can be stored in a computer-readable medium, displayed on a display device, and/or the like.

With reference now solely to FIG. 9, a flow diagram 900 illustrating a methodology 900 for detecting and identifying an object in an environment of a computing system is illustrated, where the methodology 900 is performed by a computing system. The methodology 900 starts at 902, and at 904 an image of a scene in a perspective view is obtained from a camera. That is, the camera generates the image of the scene in the perspective view and transmits the image to the computing system.

At 906, a feature image is generated based upon the image obtained at 904. At 908, a tensor is generated by a tensor generator module, where the tensor is generated based upon the feature image. The tensor includes values for bins of the tensor, where the tensor generator module is trained to sparsely generate non-zero values for the bins. At 910, an object is detected, identified, and/or tracked in the environment based upon the tensor generated by the tensor generator module. The methodology 900 completes at 912.

Now referring to FIG. 10, a flow diagram illustrating a methodology 1000 for training a tensor generator module is illustrated. The methodology 1000 starts at 1002, and at 1004 training data is obtained, where the training data includes images and labels assigned to the images. As noted above, the labels can identify objects captured in the images, boundaries of the objects, and depths of the objects. At 1006, a tensor generator module is trained based upon the training data, where the tensor generator module is trained to sparsely compute non-zero values for bins in tensors. As described above, the Gumbel-softmax algorithm can be used to train the tensor generator module. At 1008, a perception system is deployed (e.g., in AV, in a driver assistance system, in a security system, etc.), where the perception system includes the tensor generator module. The methodology completes at 1010.

Figure 11:
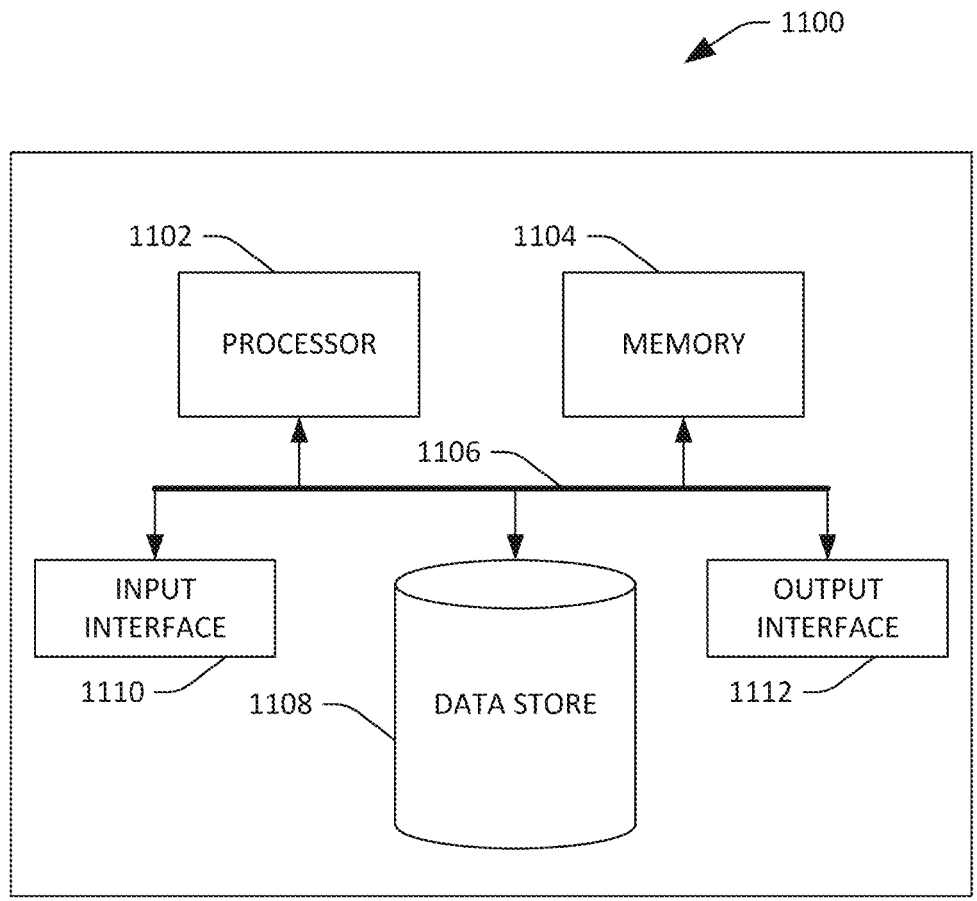
FIG. 11 illustrates a computing system.

Referring now to FIG. 11, a high-level illustration of a computing device 1100 that can be used in accordance with the systems and methodologies disclosed herein is illustrated. For instance, the computing device 1100 may be used in a system that executes the perception system 108. By way of another example, the computing device 1100 can be used in a system that trains the perception system 108. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store tensors, images, etc.

The computing device 1100 additionally includes a data store 1108 that is accessible by the processor 1102 by way of the system bus 1106. The data store 1108 may include executable instructions, tensors, images, training data, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The features described herein pertain to the examples set forth below.

(A1) In accordance with an aspect described herein, a method includes obtaining an image in a perspective view as captured by a camera that is in communication with the computing system. The method also includes generating an image in an overhead view based upon the image in the perspective view. Generating the image in the overhead view includes generating a feature image based upon the image in the perspective view, where the feature image comprises X×Y pixels, and further where values assigned to the X×Y pixels are indicative of distances between the camera and objects represented in the image in the perspective view. Generating the image in the overhead view also includes providing the feature image as input to a machine learning model, where the machine learning model generates a tensor based upon the feature image. The tensor comprises, for each pixel in the X×Y pixels, several bins that include values that are representative of likelihoods that an object exists in the environment at distances from the camera that correspond to the bins. Further, the machine learning model is trained using a Gumbel-softmax algorithm, where the image in the overhead view is generated based upon the tensor output by the machine learning model.

(A2) In some embodiments of the method of (A1), the method also includes identifying the object in the environment based upon the image in the overhead view.

(A3) In some embodiments of the method of at least one of (A1)-(A2), an autonomous vehicle comprises the computing system and the camera.

(A4) In some embodiments of the method of (A3), the method also includes controlling at least one of a propulsion system, a steering system, or a braking system of the autonomous vehicle based upon the image in the overhead view.

(A5) In some embodiments of the method of (A4), the method further includes obtaining a lidar scan of the environment, where the lidar scan corresponds in time with the image in the perspective view. The method additionally includes identifying the object in the environment based upon the image in the overhead view and the lidar scan.

(A6) In some embodiments of the method of at least one of (A4)-(A5), the method further includes obtaining a radar scan of the environment, where the radar scan corresponds in time with the image in the perspective view. The method additionally includes identifying the object in the environment based upon the image in the overhead view and the radar scan.

(A7) In some embodiments of the method of at least one of (A1)-(A6), the tensor comprises 100 bins for each pixel.

(A8) In some embodiments of the method of at least one of (A1)-(A7), generating the image in the overhead view also includes computing an outer product of the feature image and the tensor.

(B1) In another aspect, a method is performed by a computing system, where the method is for generating an overhead image of a scene based upon a perspective mage of the scene. The method includes obtaining the perspective image from a camera. The method also includes generating a feature image based upon the perspective image, where the feature image comprises X×Y pixels, and further where each pixel in the X×Y pixels has an N-dimensional feature vector that includes N feature values assigned thereto. The method further includes providing the feature image as input to a machine learning model, where the machine learning model generates a tensor based upon the feature image, where the tensor comprises, for each pixel in the X×Y pixels, several depth bins that include values that are representative of likelihoods that an object exists in the scene at distances from the camera that correspond to the depth bins, and further where the machine learning model is trained using a Gumbel-softmax algorithm. The method additionally includes generating the image in the overhead view based upon the tensor output by the machine learning model.

(B2) In some embodiments of the method of (B1), the computing system is included in an autonomous vehicle.

(B3) In some embodiments of the method of (B2), the method also includes identifying the object based upon the image in the overhead view. The method additionally includes controlling at least one of a propulsion system, a steering system, or a braking system of the autonomous vehicle based upon the identifying of the object.

(B4) In some embodiments of the method of (B3), the method also includes obtaining a lidar scan of the scene from a lidar sensor of the autonomous vehicle. The method additionally includes identifying the object based upon the lidar scan.

(B5) In some embodiments of the method of at least one of (B3)-(B4), the method also includes obtaining a radar scan of the scene from a radar sensor of the autonomous vehicle. The method additionally includes identifying the object based upon the radar scan.

(B6) In some embodiments of the method of at least one of (B1)-(B5), the tensor comprises 100 depth bins for each pixel in the X×Y pixels.

(B7) In some embodiments of the method of at least one of (B1)-(B6), generating the image in the overhead view also includes computing an outer product of the feature image and the tensor.

(C1) In yet another aspect, a computing system includes a processor and memory, where the memory stores instructions that, when executed by the processor, cause the processor to perform at least one of the methods described herein (e.g., any of (A1)-(A8), any of (B1)-(B7), etc.).

(D1) In still yet another aspect, a computer-readable storage medium includes instructions that, when executed by a processor, cause the processor to perform at least one of the methods described herein (e.g., any of (A1)-(A8), any of (B1)-(B7), etc.).

(E1) In another aspect, an AV includes a computing system that is configured to perform at least one of the methods described herein (e.g., any of (A1)-(A8), any of (B1)-(B7), etc.).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing instructions that, when executed by a processor, cause the processor to perform acts comprising:
obtaining an image in a perspective view as captured by a camera that is in communication with the computing system; and
generating an image in an overhead view based upon the image in the perspective view, wherein generating the image in the overhead view comprises:
generating a feature image based upon the image in the perspective view, where the feature image comprises X×Y pixels, and further where values assigned to the X×Y pixels are indicative of distances between the camera and objects represented in the image in the perspective view; and
providing the feature image as input to a machine learning model, where the machine learning model generates a tensor based upon the feature image, where the tensor comprises, for each pixel in the X×Y pixels, several bins that include values that are representative of likelihoods that an object exists in the environment at distances from the camera that correspond to the bins, and further where the machine learning model is trained using a Gumbel-softmax algorithm to assign a value of zero to a bin of the tensor when a likelihood of an object existing at a spatial position corresponding to the bin is low and to assign a non-zero value to the bin indicative of the likelihood when the likelihood of the object existing at the spatial position corresponding to the bin is high, wherein the Gumbel-softmax algorithm employs a temperature parameter that decreases over time during training, the temperature parameter controlling a number of non-zero values computed for bins in the tensor, wherein the image in the overhead view is generated based upon the tensor output by the machine learning model.

2. The computing system of claim 1, the acts further comprising:
identifying the object in the environment based upon the image in the overhead view.

3. The computing system of claim 1, wherein an autonomous vehicle comprises the computing system and the camera.

4. The computing system of claim 3, the acts further comprising
controlling at least one of a propulsion system, a steering system, or a braking system of the autonomous vehicle based upon the image in the overhead view.

5. The computing system of claim 4, the acts further comprising:
obtaining a lidar scan of the environment, where the lidar scan corresponds in time with the image in the perspective view; and
identifying the object in the environment based upon the image in the overhead view and the lidar scan.

6. The computing system of claim 4, the acts further comprising:
obtaining a radar scan of the environment, where the radar scan corresponds in time with the image in the perspective view; and
identifying the object in the environment based upon the image in the overhead view and the radar scan.

7. The computing system of claim 1, wherein the tensor comprises 100 bins for each pixel.

8. The computing system of claim 1, wherein generating the image in the overhead view further comprises:
computing an outer product of the feature image and the tensor.

9. A method performed by a computing system for generating an overhead image of a scene based upon a perspective image of the scene, the method comprising:
obtaining the perspective image from a camera;
generating a feature image based upon the perspective image, where the feature image comprises X×Y pixels, and further where each pixel in the X×Y pixels corresponds to an N-dimensional feature vector that includes N feature values assigned thereto;
providing the feature image as input to a machine learning model, where the machine learning model generates a tensor based upon the feature image, where the tensor comprises, for each pixel in the X×Y pixels, several depth bins that include values that are representative of likelihoods that an object exists in the scene at distances from the camera that correspond to the depth bins, and further where the machine learning model is trained using a Gumbel-softmax algorithm to assign a value of zero to a bin of the tensor when a likelihood of an object existing at a spatial position corresponding to the bin is low and to assign a non-zero value to the bin indicative of the likelihood when the likelihood of the object existing at the spatial position corresponding to the bin is high, wherein the Gumbel-softmax algorithm employs a temperature parameter that decreases over time during training, the temperature parameter controlling a number of non-zero values computed for bins in the tensor; and
generating the image in the overhead view based upon the tensor output by the machine learning model.

10. The method of claim 9, wherein the computing system is included in an autonomous vehicle.

11. The method of claim 10, further comprising:
identifying the object based upon the image in the overhead view; and controlling at least one of a propulsion system, a steering system, or a braking system of the autonomous vehicle based upon the identifying of the object.

12. The method of claim 11, further comprising:
obtaining a lidar scan of the scene from a lidar sensor of the autonomous vehicle; and
identifying the object based upon the lidar scan.

13. The method of claim 11, further comprising:
obtaining a radar scan of the scene from a radar sensor of the autonomous vehicle; and
identifying the object based upon the radar scan.

14. The method of claim 9, wherein the tensor comprises 100 depth bins for each pixel in the X×Y pixels.

15. The method of claim 9, wherein generating the image in the overhead view further comprises:
computing an outer product of the feature image and the tensor.

16. A non-transitory computer-readable storage medium comprising instructions that, when executed by a processor, cause the processor to perform acts comprising:
obtaining a perspective image from a camera;
generating a feature image based upon the perspective image, where the feature image comprises X×Y pixels, and further where each pixel in the X×Y pixels corresponds to an N-dimensional feature vector that includes N feature values assigned thereto;
generating, by a machine learning model, a tensor based upon the feature image, where the tensor comprises, for each pixel in the X×Y pixels, several bins that include values that are representative of likelihoods that an object exists in the scene at distances from the camera that correspond to the depth bins, and further where the machine learning model is trained using a Gumbel-softmax algorithm to assign a value of zero to a bin of the tensor when a likelihood of an object existing at a spatial position corresponding to the bin is low and to assign a non-zero value to the bin indicative of the likelihood when the likelihood of the object existing at the spatial position corresponding to the bin is high, wherein the Gumbel-softmax algorithm employs a temperature parameter that decreases over time during training, the temperature parameter controlling a number of non-zero values computed for bins in the tensor; and
generating an image in an overhead view based upon the tensor generated by the machine learning model.

17. The non-transitory computer-readable storage medium of claim 16, wherein the computing system is included in an autonomous vehicle.

18. The non-transitory computer-readable storage medium of claim 17, the acts further comprising:
identifying the object based upon the image in the overhead view; and controlling at least one of a propulsion system, a steering system, or a braking system of the autonomous vehicle based upon the identifying of the object.

19. The non-transitory computer-readable storage medium of claim 18, the acts further comprising:
obtaining a lidar scan of the scene from a lidar sensor of the autonomous vehicle; and
identifying the object based upon the lidar scan.

20. The non-transitory computer-readable storage medium of claim 18, the acts further comprising:
obtaining a radar scan of the scene from a radar sensor of the autonomous vehicle; and
identifying the object based upon the radar scan.

* * * * *